United States Patent
Singh et al.

(10) Patent No.: US 9,575,795 B2
(45) Date of Patent: Feb. 21, 2017

(54) REVERTING A VIRTUAL RESOURCE TO ITS BASE CONFIGURATION USING THE SNAPSHOT IMAGE BASED ON FREQUENCY THE VIRTUAL RESOURCE IS REQUESTED

(71) Applicants: Ashish Kumar Singh, Hyderabad (IN); Manish Jha, Hyderabad (IN)

(72) Inventors: Ashish Kumar Singh, Hyderabad (IN); Manish Jha, Hyderabad (IN)

(73) Assignee: CA, Inc., New York, NY (US)

( * ) Notice: Subject to any disclaimer, the term of this patent is extended or adjusted under 35 U.S.C. 154(b) by 54 days.

(21) Appl. No.: 14/604,868

(22) Filed: Jan. 26, 2015

(65) Prior Publication Data

US 2016/0216986 A1 Jul. 28, 2016

(51) Int. Cl.
G06F 9/455 (2006.01)
G06F 9/46 (2006.01)
G06F 9/48 (2006.01)
G06F 9/50 (2006.01)

(52) U.S. Cl.
CPC ........... *G06F 9/45558* (2013.01); *G06F 9/461* (2013.01); *G06F 9/485* (2013.01); *G06F 9/5022* (2013.01); *G06F 9/5077* (2013.01); *G06F 2009/4557* (2013.01); *G06F 2009/45595* (2013.01); *G06F 2209/508* (2013.01); *G06F 2209/5011* (2013.01)

(58) Field of Classification Search
CPC ...... G06F 9/45558; G06F 9/461; G06F 9/485; G06F 9/5022; G06F 9/5077
See application file for complete search history.

(56) References Cited

U.S. PATENT DOCUMENTS

| | | | | |
|---|---|---|---|---|
| 2005/0198303 A1* | 9/2005 | Knauerhase | .......... | G06F 9/5055 709/227 |
| 2007/0261056 A1* | 11/2007 | Iizuka | ....................... | G06F 8/61 718/100 |
| 2007/0288224 A1* | 12/2007 | Sundarrajan | .......... | G06F 9/5072 703/22 |
| 2008/0263553 A1* | 10/2008 | Lueck | .................... | G06F 9/505 718/102 |
| 2009/0070174 A1* | 3/2009 | Cei | ....................... | G06Q 10/02 705/5 |

(Continued)

OTHER PUBLICATIONS

Eric Hammersley, Professional VMware Server, Dec. 2006, pp. 143-144, ISBN: 978-0-470-07988-1.*

*Primary Examiner* — Meng An
*Assistant Examiner* — Jorge A Chu Joy-Davila
(74) *Attorney, Agent, or Firm* — Baker Botts L.L.P.

(57) ABSTRACT

A method includes instantiating a virtual resource and, in response to instantiating the virtual resource, generating a snapshot image comprising a base configuration of the virtual resource. The method also includes receiving a request to de-provision the virtual resource and, in response to receiving the request to de-provision the virtual resource, determining, using a processor, whether the base configuration of the virtual resource is in a set of highly utilized virtual resource configurations based on virtual resource utilization data. The method further includes, in response to determining that the base configuration of the virtual resource is in the set of highly utilized virtual resource configurations: reverting the virtual resource to its base configuration using the snapshot image and allocating the virtual resource to a resource pool.

20 Claims, 7 Drawing Sheets

(56) References Cited

U.S. PATENT DOCUMENTS

| | | | |
|---|---|---|---|
| 2011/0238838 A1* | 9/2011 | Avalani | G06F 9/5011 |
| | | | 709/226 |
| 2012/0096457 A1* | 4/2012 | Gupta | G06F 9/45558 |
| | | | 718/1 |
| 2012/0131577 A1* | 5/2012 | Arcese | G06F 8/60 |
| | | | 718/1 |
| 2013/0055258 A1* | 2/2013 | De | G06F 9/45533 |
| | | | 718/1 |
| 2013/0227710 A1* | 8/2013 | Barak | G06F 21/10 |
| | | | 726/29 |
| 2014/0165060 A1* | 6/2014 | Muller | G06F 9/45533 |
| | | | 718/1 |
| 2014/0189685 A1* | 7/2014 | Kripalani | G06F 8/65 |
| | | | 718/1 |

* cited by examiner

| Self Serviced Request | Request Request Area Symbol | Total Request | # of Success | Sucess Rate |
|---|---|---|---|---|
| Virtual Snapshot Request | Application.LoD.Virtual.Snapshot Request | 17,767 | 15,406 | 86.71% |
| Virtual Return Lease Request | Application.LoD.Virtual.Return Lease Request | 18,248 | 18,179 | 99.62% |
| Virtual Provision Request | Application.LoD.Virtual.Provision Request | 35,878 | 28,053 | 78.19% |
| Virtual Power On Request | Application.LoD.Virtual.Power On Request | 14,132 | 12,931 | 91.50% |
| Virtual Power Off Request | Application.LoD.Virtual.Power Off Request | 7,984 | 7,072 | 88.58% |
| Virtual Extend Lease Request | Application.LoD.Virtual.Extend Lease Request | 47,848 | 43,069 | 90.01% |
| Virtual Change Owner | Application.LoD.Virtual.Change Owner | 1,222 | 1,196 | 97.87% |
| Virtual Add Memory Request | Application.LoD.Virtual.Add Memory Request | 184 | 179 | 97.28% |
| Virtual Add CPU Request | Application.LoD.Virtual.Add CPU Request | 1,258 | 1,204 | 95.71% |
| Physical Return Lease Request | Application.LoD.Physical.Return Lease Request | 2,505 | 2,095 | 83.63% |
| Physical Re-Image Request | Application.LoD.Physical.Re-Image Request | 554 | 394 | 71.12% |
| Physical Provision Request | Application.LoD.Physical.Provision Request | 7,431 | 7,429 | 99.97% |
| Physical Extend Lease Request | Application.LoD.Physical.Extend Lease Request | 2,010 | 2,010 | 100.00% |
| Physical Add Software Request | Application.LoD.Physical.Add Software Request | | | |
| Total | | 157,021 | 139,217 | 88.66% |

FIG. 7

REVERTING A VIRTUAL RESOURCE TO ITS BASE CONFIGURATION USING THE SNAPSHOT IMAGE BASED ON FREQUENCY THE VIRTUAL RESOURCE IS REQUESTED

BACKGROUND

The disclosure relates generally to infrastructure performance enhancement, and more specifically, to infrastructure performance enhancement with adaptive resource preservation.

SUMMARY

According to one embodiment of the disclosure, a method includes instantiating a virtual resource and, in response to instantiating the virtual resource, generating a snapshot image comprising a base configuration of the virtual resource. The method also includes receiving a request to de-provision the virtual resource and, in response to receiving the request to de-provision the virtual resource, determining, using a processor, whether the base configuration of the virtual resource is in a set of highly utilized virtual resource configurations based on virtual resource utilization data. The method further includes, in response to determining that the base configuration of the virtual resource is in the set of highly utilized virtual resource configurations: reverting the virtual resource to its base configuration using the snapshot image and allocating the virtual resource to a resource pool.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Large IT organizations often require end-to-end infrastructure management with around the clock availability and performance for virtual applications, products, and services. Virtualization management products facilitate resource demand modeling forecasting and planning, as well as provide modification and configuration capabilities for managed virtual resources. Such offerings may recommend adding or consolidating physical hardware resources based on forecasted demand. Certain infrastructure management tools may model forecasted demand and schedule system tasks during non-peak, off, or down times to increase resource availability during peak usage times. However, these tools may do little more than merely shuffle the timing of tasks. For example, certain operations may be postponed or prioritized based on various factors. Thus, resource consumption may not be reduced, but merely delayed until some future time. Such solutions where consumption is not reduced may not effectively enhance performance of IT infrastructures required to provide high availability at all times. For example, international companies may require around the clock availability due to the diverse regions of the world in which its employees may be stationed.

IT administrators may desire alternative models for increasing efficiency and performance of existing resources by reducing resource consumption of certain tasks instead of merely increasing physical resources to meet growing demand. For example, IT administrators may desire infrastructure management products that enable virtualization infrastructure hosting products, services, and applications to do more with fewer resources instead of merely managing existing resources.

When demand increases, excessive input/output operations on storage controllers and networks may decrease performance. System failures and performance issues may result. For example, provisioning resources may be a relatively costly operation to perform. Similarly, deleting or de-provisioning resources may additionally tie up system resources. The teachings of the present disclosure may both improve performance and reduce resource consumption by avoiding these operations for particular resources. For example, resources may be preserved instead of being instantiated, deleted, or de-provisioned In certain embodiments of the present disclosure, templated resources may be preserved according to an adaptive model accounting for various factors. For example, template resources may be created for frequently used resource configurations. These templated resources may be preserved in order to reduce resource utilization costs.

The teachings of the present disclosure may discuss an adaptive model for preserving virtual resources using a templated approach to virtual resource management that customizes base system templates for individual users and leverages virtual machine snapshots to circumvent traditional system tasks associated with virtual resource management. Accordingly, the teachings of the present disclosure may reduce resource consumption of virtualization management tasks through an adaptive preserving model for infrastructure management tasks.

Embodiments of the present disclosure may overcome challenges such as high resource provisioning time and request-overload during peak consumption times. Embodiments of the present disclosure may additionally overcome large input/output demands placed on storage controllers and networks during peak usage times. Performance issues and system failures may also be avoided using the teachings of the present disclosure. Embodiments of the present disclosure may additionally reduce customer wait-times during peak utilization periods and particular templates may be accessed quicker.

Figure 1:
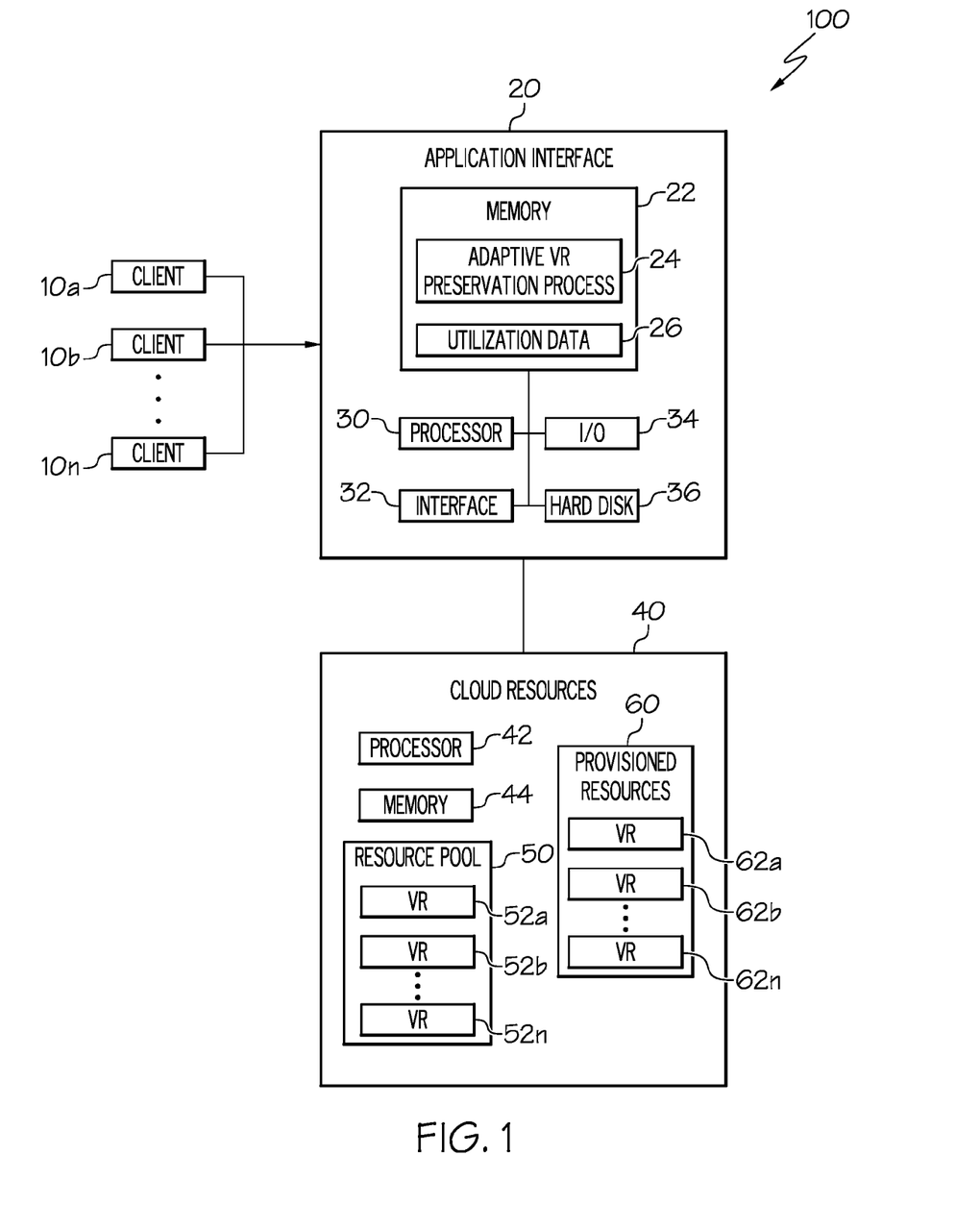
FIG. 1 illustrates a block diagram of a system for enhancing infrastructure performance with adaptive resource preservation in accordance with a non-limiting embodiment of the present disclosure.

With reference to FIG. 1, a system 100 for enhancing infrastructure performance with adaptive resource preservation is illustrated in accordance with a particular non-limiting embodiment of the present disclosure. System 100 includes clients 10*a-n*, application interface 20, and resources 40. Resources 40 may be a virtualization environment for provisioning and hosting virtual resources such as virtual machines, containers, appliances, and other workloads.

Workloads may refer to any computing task or virtual resource. For example, a request to display a web-page may be a workload. As another example, a virtual machine instance may be a workload. Tasks may refer to operations executed on a workload. For example, a task may include a request to provision a new system (i.e., provision a workload). As another example, a task may include a request to de-provision an existing system. As yet another example, a task may include reverting a provisioned system to a base snapshot image. Such a task may consume fewer resources and take less time relative to the provisioning and/or de-provisioning tasks.

Provisioning resources may include any process of preparing, supporting, and/or equipping virtual services or resources. For example, cloud users may obtain cloud services and/or resources through a catalog or self-service portal. Thus, cloud virtual resources may be acquired by users themselves or by IT administrators. De-provisioning resources may refer to removing or deleting provisioned resources. For example, IT administrators may de-provision virtual resources.

Referring back to FIG. 1, clients 10a-n may request resources using application interface 20. Application interface 20 includes memory 22, processor(s) 30, interface 32, I/O 34, and hard disk 36. Processors 30 may be operable to load instructions from hard disk 36 into memory 22 and execute those instructions. For example, processors 30 may execute an adaptive virtual resource preservation process 24 in memory 22.

Virtual resource preservation process 24 may receive requests from clients 10a-n and allocate requests according to an adaptive preservation model based on utilization data 26. Utilization data 26 may include information regarding resource usage characteristics. For example, utilization data 26 may include usage trends for particular resources (e.g., VRs 52a-n or 62a-n).

In certain embodiments, cloud resources 40 includes processor 42, memory 44, resource pool 50, including VRs 52a-n, and provisioned resources 60 including provisioned VRs 62a-n. Cloud resources 40 may include one or more servers that act in concert to provide a single cloud computing platform that hosts resources.

In certain embodiments, adaptive preservation process 24 receives requests from clients 10a-n. For example, adaptive preservation process 24 may receive provisioning requests. That is, adaptive preservation process 24 may receive requests from users to provision new virtual resources. Certain systems may be provisioned from a disk image. For example, a disk image may be mounted and started, and then allocated to a particular client 10a-n. Such provisioning tasks may increase system resource utilization. For example, fulfilling a request to provision a new resource may require various underlying physical system resources to process instructions for starting up the system. Memory utilization may also increase and available capacity may decrease.

In certain embodiments, adaptive resource preservation process 24 may determine and follow a preservation model. The preservation model may control various aspects of resource tasks. For example, the preservation model may specify template resources. The template resources may be determined in conjunction with the utilization data 26. The template resources may correspond to frequently used and/or requested resources. The templates may be specifications of frequently used and/or requested resources. Adaptive resource preservation process 24 may provision resources according to virtual resources templates. These resources may be stored in resource pool 50 as VRs 50a-n. A snapshot image of each of these resources may be generated. The snapshot image may be generated at or near instantiation or provisioning of the resource. For example, the snapshot image may be a base snapshot image.

Applications may be installed before and/or after imaging the base snapshot image. For example, an operating system and various software may be installed as a resource before a base snapshot image is imaged. As another example, configuration settings may be modified after provisioning or instantiation of the resource before imaging the snapshot image.

In certain embodiments, the base snapshot image may reflect an unaltered base image of the resource. For example, the base snapshot image may reflect the state of the resource before the image has been modified by any users. This base snapshot image may represent a "fresh" system, without any modifications. Thus, the base snapshot image may closely approximate a newly provisioned system.

In certain embodiments, a client, such as client 10a-n may request the provisioning of a system A (not illustrated). System A may include a particular configuration scheme. Adaptive preservation process 24 may search resource pool 50 for an available resource with a matching configuration scheme. If a matching resource is found, the resource may be allocated to client 10a. When client 10a is done with the resource, adaptive resource preservation process 24 may revert the resource to its base snapshot. Accordingly, the resource may now be in a state that closely approximates its state soon after it was provisioned. The resource may be stored in a resource pool, such as resource pool 50.

The teachings of the present disclosure may monitor resource utilization and adapt the preservation model accordingly. For example, if a particular configuration including Windows Server 2012 with a particular hardware configuration becomes increasingly popular among client requests, adaptive resource preservation process may adjust the preservation model to increase the number of resources in resource pool 50 that match the particular configuration. Thus, as usage changes, adaptive resource preservation process 24 modifies the set of preconfigured resources accordingly.

When client 10a requests a particular configuration that is available in resource pool 50, allocating the pre-provisioned resource may eliminate resource consumption that would normally be required to provision a new system for the user. The provisioned resource assigned to client 10a may have been reverted to the baseline "fresh" system image. Accordingly, the user may be unaware of the difference between the allocated system and a newly provisioned system.

In certain embodiments, resource utilization may be conserved during de-provisioning and deletion requests as well. For example, client 10a may have one or more assigned resources. Client 10a may, however, not require services provided by a particular resource anymore. Thus, client 10a may de-provision or delete the resource. Adaptive resource preservation process 24 may determine whether the resource in question is in the list of templated resources currently being preserved. For example, the preservation model may be consulted for a list of resource specifications that are currently being preserved for later use. If the resource is within such a list, the resource is reverted to its base snapshot image and allocated form client 10a to the resource pool 50.

In certain embodiments, a resource is requested that is not in the preservation model. For example, a resource having a new operating system or hardware configuration may be requested before that resource is widely adopted. Adaptive resource preservation process 24 may take a base snapshot image of the resource at or shortly after provisioning or instantiation of the resource. When a user requests de-provisioning of a system, the preservation model may be checked. If the configuration has been added to the preservation model, the resource may be reverted to the base configuration and the resource may be loaded to the resource pool. Thus, when additional requests for resources matching the system configuration of the resource, the resource may be allocated to the requesting user in the base state. Accordingly, several provisioning operations may be saved or skipped by utilizing this method.

In certain embodiments, the preservation model may specify the number of, type of, and configuration of resources that may be provisioned for a particular resource configuration at any given time within a cloud environment. In certain embodiments, the resources within resource pool 50 and provisioned resources 60 may be added for the purposes of determining the total number of resource instances running in a given cloud environment. The preservation model may further specify thresholds, trends, and other settings for automatically configuring and adapting available resources.

For example, if the preservation model contains a total of 100 resources with a first resource configuration and there are only 50 resources currently provisioned within cloud environment 40, adaptive preservation process 24 may schedule provisioning of additional resources matching the first resource configuration. The adaptive preservation process 24 may schedule these resources for provisioning at valley utilization times. For example, a valley utilization time may be a time during the consumption schedule for a cloud environment wherein the cloud environment resources are not being highly utilized, such as on a weekend, holiday, or at night. In this manner, provisioning of resources may not disturb users currently interacting with cloud resources.

In certain embodiments, de-provisioning of under-utilized systems may also occur in such a manner as to reduce the overall system utilization during peak times. For example, if a user requests to de-provision a system, the preservation model is checked. If the resource is not in the preservation model, the resource may be scheduled for deletion or removal. The scheduling may be based on valley utilization times as determined by historical utilization data.

Figure 2:
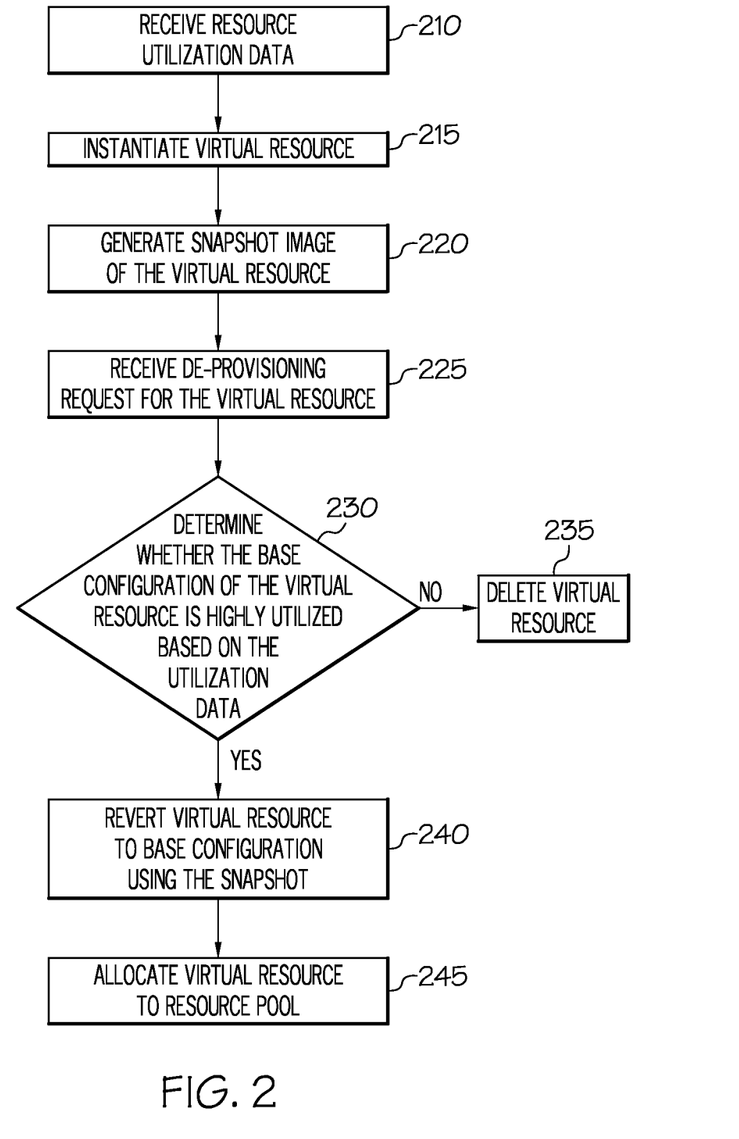
FIG. 2 illustrates a flow chart of a method for enhancing infrastructure performance with adaptive resource preservation in accordance with a non-limiting embodiment of the present disclosure.

With reference to FIG. 2, a method for enhancing infrastructure performance with adaptive preservation modeling is illustrated. At step 210, Virtual resource utilization data is received. The utilization data may include, inter alia, the number and type of resources deployed in a particular environment, capacity consumption metrics regarding hardware and virtual resources from that environment, usage data regarding how often users request particular configurations, and utilization data regarding how frequently users use the particular resources that they've requested.

At step 215, a virtual resource is instantiated. In certain embodiments a user requests that a particular system be provisioned. The user may do so by use of a graphical user interface. For example, the user may use a web interface to interact with a cloud provider. The user may interact with the interface to request that a system be provisioned to the user and allocated for his/her use. The user may specify system characteristics, such as the number and type of processors, the amount of memory, the amount of hard disk capacity, the type of operating system, any applications the user would like pre-loaded on the system, and databases or web servers the user would like pre-loaded on the system. Many other options regarding the configuration of the system may be selected by the user.

In certain embodiments, the user may be presented with a list of templated resources. The user may select a templated resource from the list. Such a list may influence a user into selecting a templated system, such that instances of that templated system may be stored in a resource pool and merely allocated to the user, not provisioned from scratch, in response to the provisioning request.

At step 220, a base snapshot image of a provisioned resource is generated. In certain embodiments, the base snapshot image may closely approximate the state of the system at its initial state. That is to say, the base snapshot image may include any applications, databases, or additional settings that were specified by the user. The base snapshot image may be stored in a library with other base snapshot images for various other instantiated virtual resources. For example, snapshot images may be indexed and sorted by resource configuration. A name may be given to each resource configuration for purposes of querying and retrieving matching resource base snapshot images.

At step 225, a de-provisioning request is received for the provisioned resource. For example, a user may be finished with his/her use of the resource. The user may request, using an interface such as a web interface to a cloud service provider, that the provisioned resource be de-provisioned or deleted. In certain embodiments, a system may automatically determine, for example, using system utilization data, that the user has not used a particular resource for a particular amount of time. The system may automatically de-provision such resources. In other words, the system may send itself the de-provisioning request for the virtual resource.

At step 230, a preservation model is used to determine whether the base configuration of the virtual resource is a highly utilized virtual resource. In certain embodiments, the utilization data is used to determine whether the resource configuration is highly utilized. Highly utilized virtual resources may include resources that are popular currently with users. The system may use various methods to determine highly utilized resources. In certain embodiments, trends are detected in the utilization data to determine resources that requested above a certain threshold, and trending upwards. In certain embodiments, various thresholds and tests are used to determine a set of highly utilized resources.

Resource configurations may be de-serialized into a list of configuration variables. For example, resource specifications may include number/type of processors, amount/type of memory, storage capacity, system architecture, applications, etc. These specifications may be compared to a list of highly utilized resource specifications to determine whether the base configuration for the virtual resource is in the set of highly utilized resources.

If the base configuration of the resource is not in the set of highly utilized resources, the virtual resource is scheduled for deletion or de-provisioning at step 235. The system may use resource utilization data to schedule a desirable time to schedule deletion of the resource. In certain embodiments, a cost-benefit analysis may be conducted to determine whether immediate deletion of the resource may be more desirable to free up resources. Sometimes, immediate deletion of the resource may be undesirable due to the resource cost associated with de-provisioning a resource. For example, postponing deletion of a resource may be more desirable during peak utilization times.

If the base configuration of the resource is in the set of highly utilized resources, the virtual resource is reverted to its base configuration using the base snapshot image and placed in the resource pool at steps 240 and 245. In certain embodiments, the resource may be reused during the next provisioning request for such a system.

Figure 3:
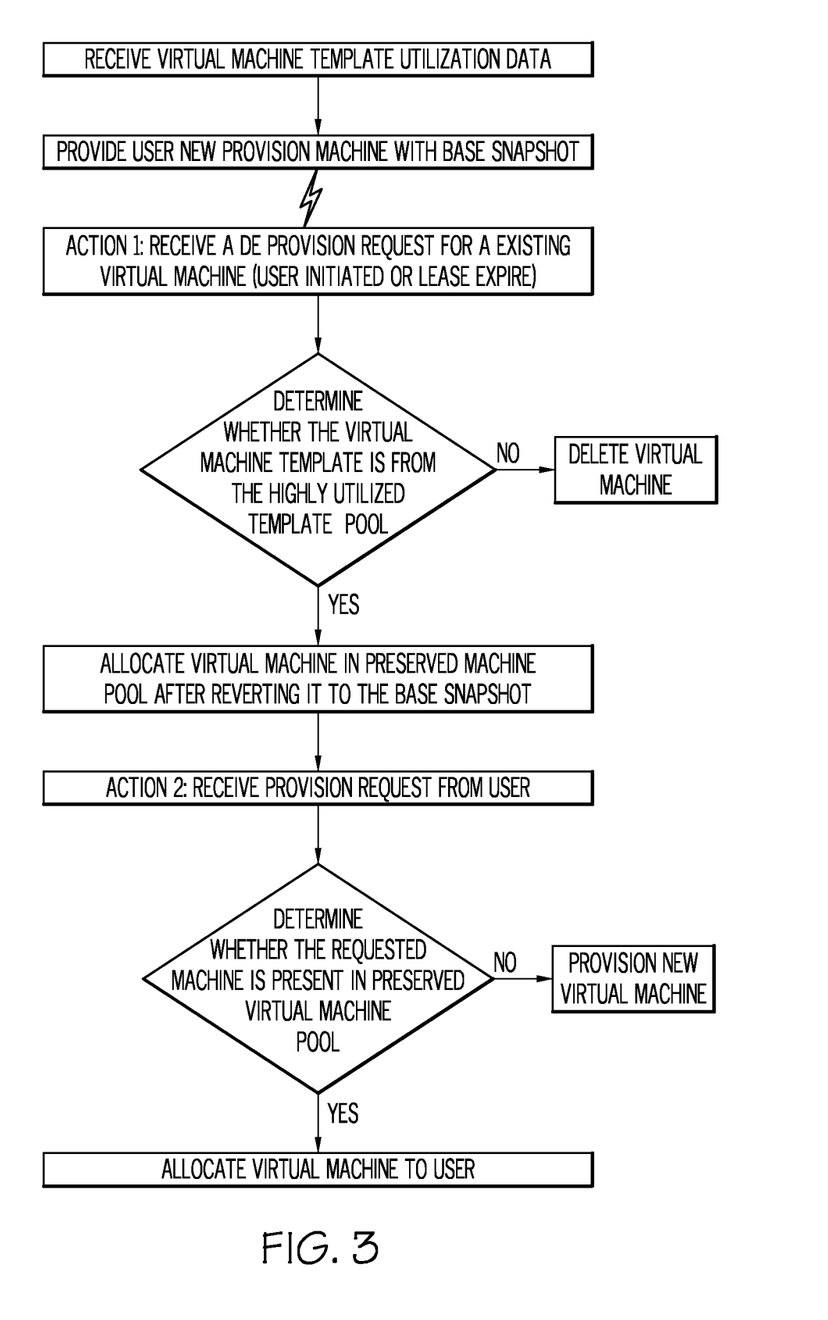
FIG. 3 illustrates another flow chart of a method for enhancing infrastructure performance with adaptive resource preservation in accordance with a non-limiting embodiment of the present disclosure.

With reference to FIG. 3, virtual machine template utilization data is received Template utilization data may refer to data about the utilization of various resource templates. Template utilization data may represent a more generalized view of resource utilization data in that the data may be generalized to contain metrics regarding the use of resource templates, instead of individual resources. For example, data may be collected for various resources and aggregated based on the template that system was generated based on. The template may refer to the initial system configuration settings.

A user is provided with a new machine and a base snapshot image is generated for the provided system. In certain embodiment, a new system is provisioned for the user.

A request for an existing virtual machine to be de-provisioned may be received. The request may be user initiated or may be do to the user's lease for the system expiring. For example, a user may request a resource for a given period. At the expiration of that period, the system may be automatically reclaimed by the provisioning system.

Still referring to FIG. 3, the system determines whether the virtual machine template is from the pool of highly utilized templates. The system may use any of the above described methods of determining this. Additionally, the system may use methods yet undisclosed for determining whether the virtual machine template is included in the resource pool.

If the virtual machine is not found in the highly utilized template pool, the virtual machine is scheduled for deletion or de-provisioning.

If the virtual machine is found in the pool of highly utilized resource templates, the virtual machine is allocated to another user after reverting it to its own base snapshot image. In certain embodiments, the same base snapshot image may be used for reverting various resources to a base snapshot image.

Still referencing FIG. 3, A provision request is received from a user, and the system determines whether a resource having the requested configuration is located in the virtual machine pool. The resource that was stored in the resource pool may be allocated to the user.

Figure 4:
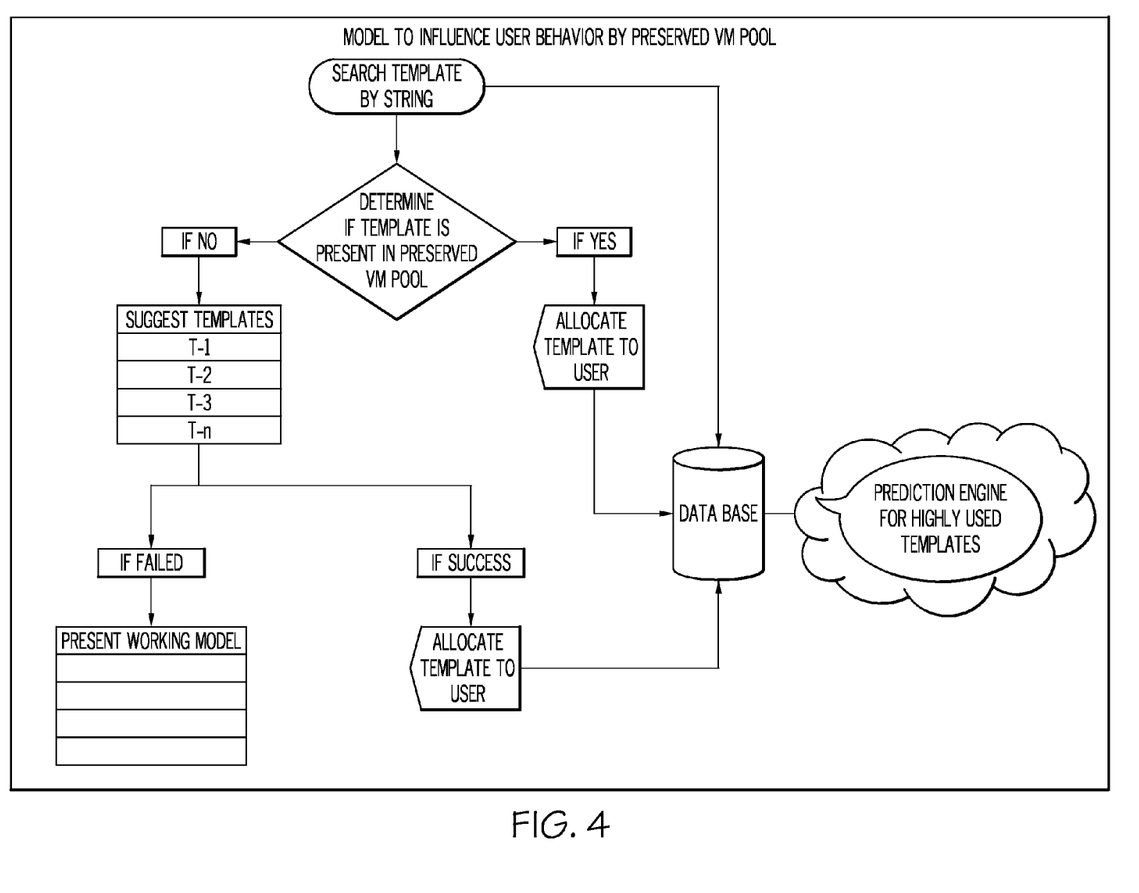
FIG. 4 illustrates a system diagram with logic for a system for enhancing infrastructure performance with adaptive resource preservation in accordance with a non-limiting embodiment of the present disclosure.

With reference to FIG. 4, a flowchart for a model for influencing user behavior with a preserved virtual machine pool is illustrated. In certain embodiments, presenting a user with a set of pre-configured virtual machines that have already been instantiated or provisioned may influence the user to select a pre-configured virtual machine, rather than a custom resource with only slight variations. The user may select the pre-configured resource because the user may understand that provisioning a resource may take significant time and the user may be willing to accept the template resource due to the reduced time required to allocate the pre-provisioned resource to him/her.

Templates may be searched using a string or a text phrase. For example, a user may enter configuration settings and/or a template name into a user interface for provisioning resources. The system may search a list of templates that are available in the resource pool for resources that match the entered text phrase.

If the template is not present in the resource pool, the user may be presented with a list of similar templates that are in the resource pool (i.e., Templates T-1 to T-n in FIG. 4). The user may then select a template from the list, or may insist that the system create the custom template by declining use of any matching resources.

Figure 5:
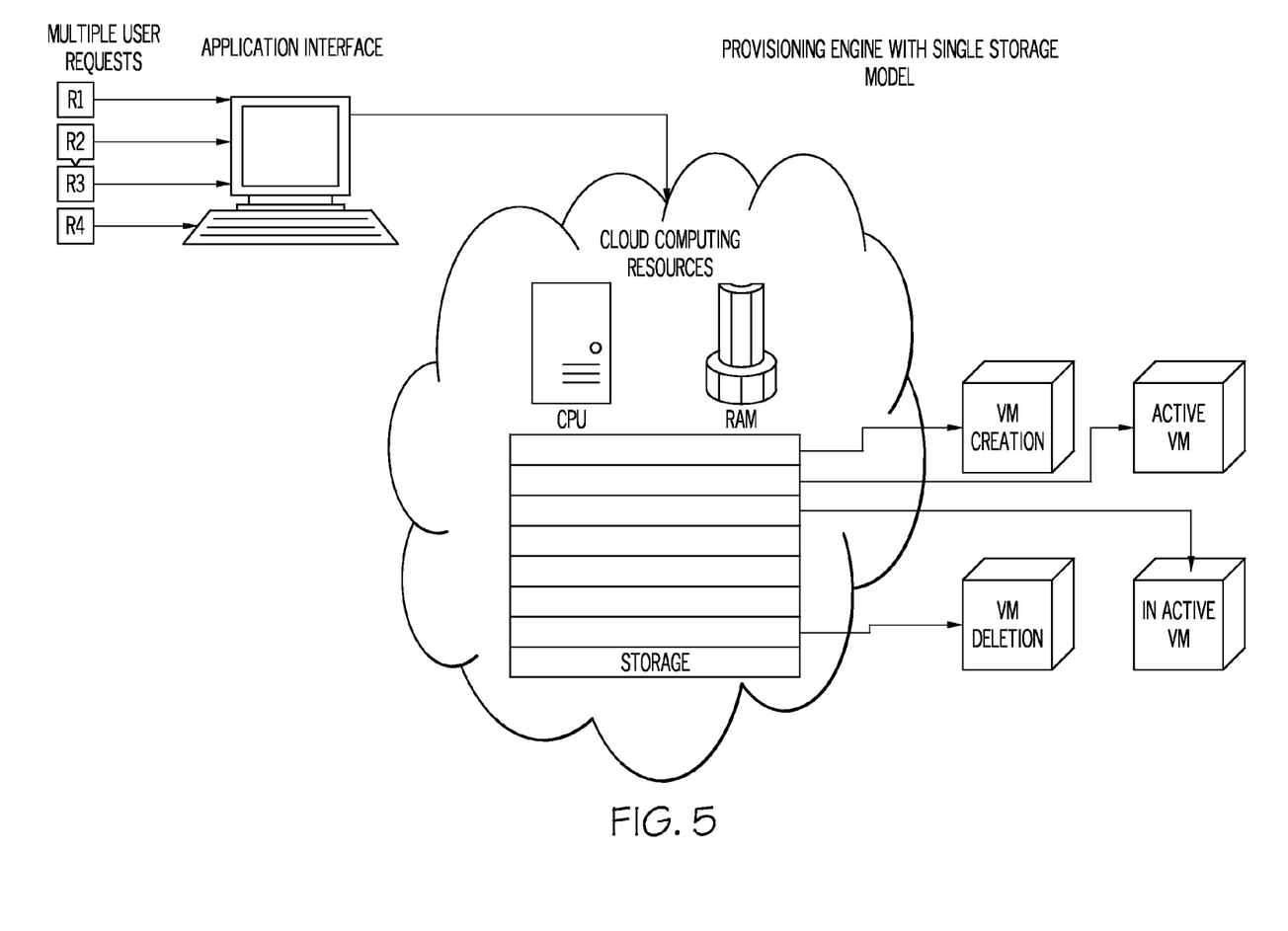
FIG. 5 illustrates yet another diagram of a system for enhancing infrastructure performance with adaptive resource preservation in accordance with a non-limiting embodiment of the present disclosure.

With reference to FIG. 5, a high level diagram of a provisioning engine is illustrated. In certain embodiments, the teachings of the present disclosure are implemented using a provisioning engine in conjunction with a virtualized cloud environment. User requests are received at an application interface and a provisioning engine allocates virtual resources of the cloud computing environment to each requesting user. Provisioning and de-provisioning costs may be high in such a model that does not preserve resources in a pool for immediate allocation.

Figure 6:
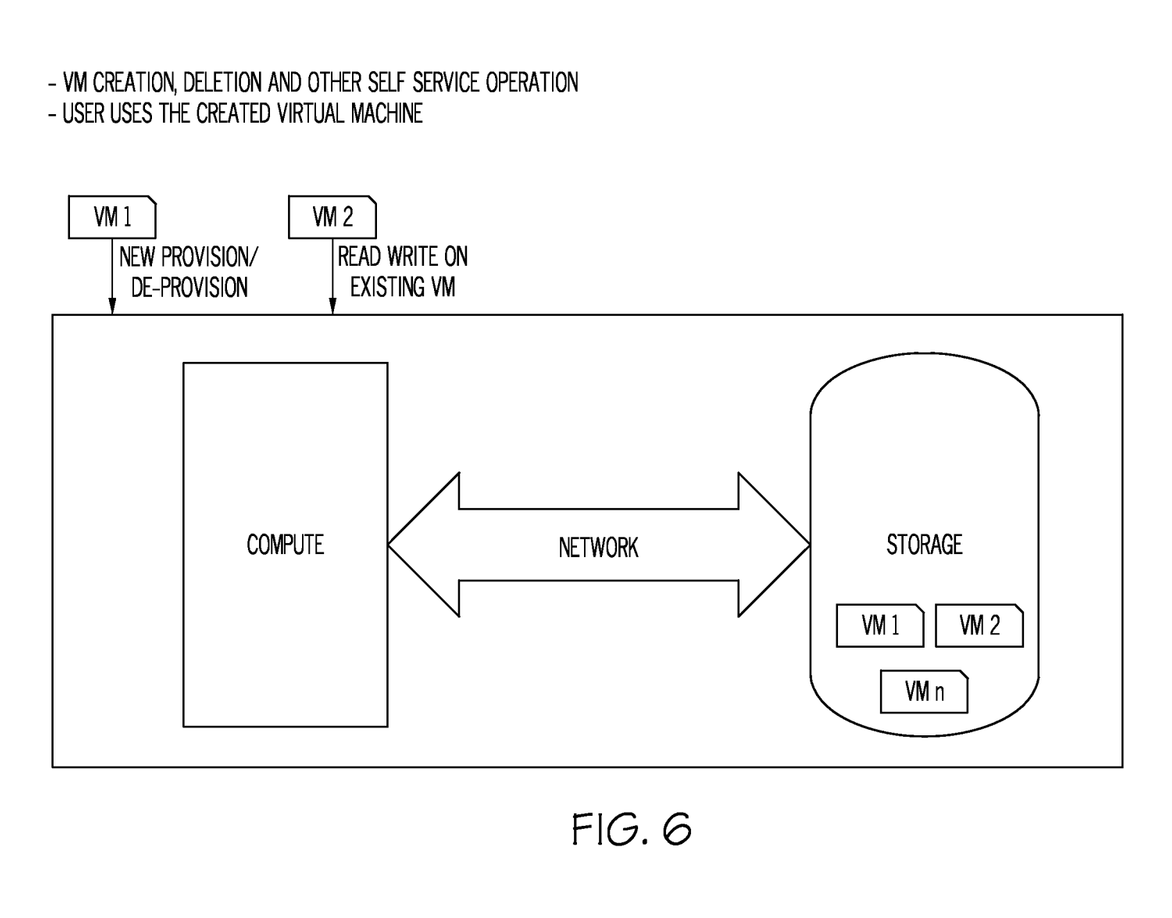
FIG. 6 illustrates example classes of self service operations performed on virtual resources in accordance with a non-limiting embodiment of the present disclosure.

With reference to FIG. 6, different self service operations classes of user requests are discussed. User provisioning operations may include provisioning and de-provisioning requests. Users may also issue requests to provisioned systems such as read/write operations.

Figure 7:
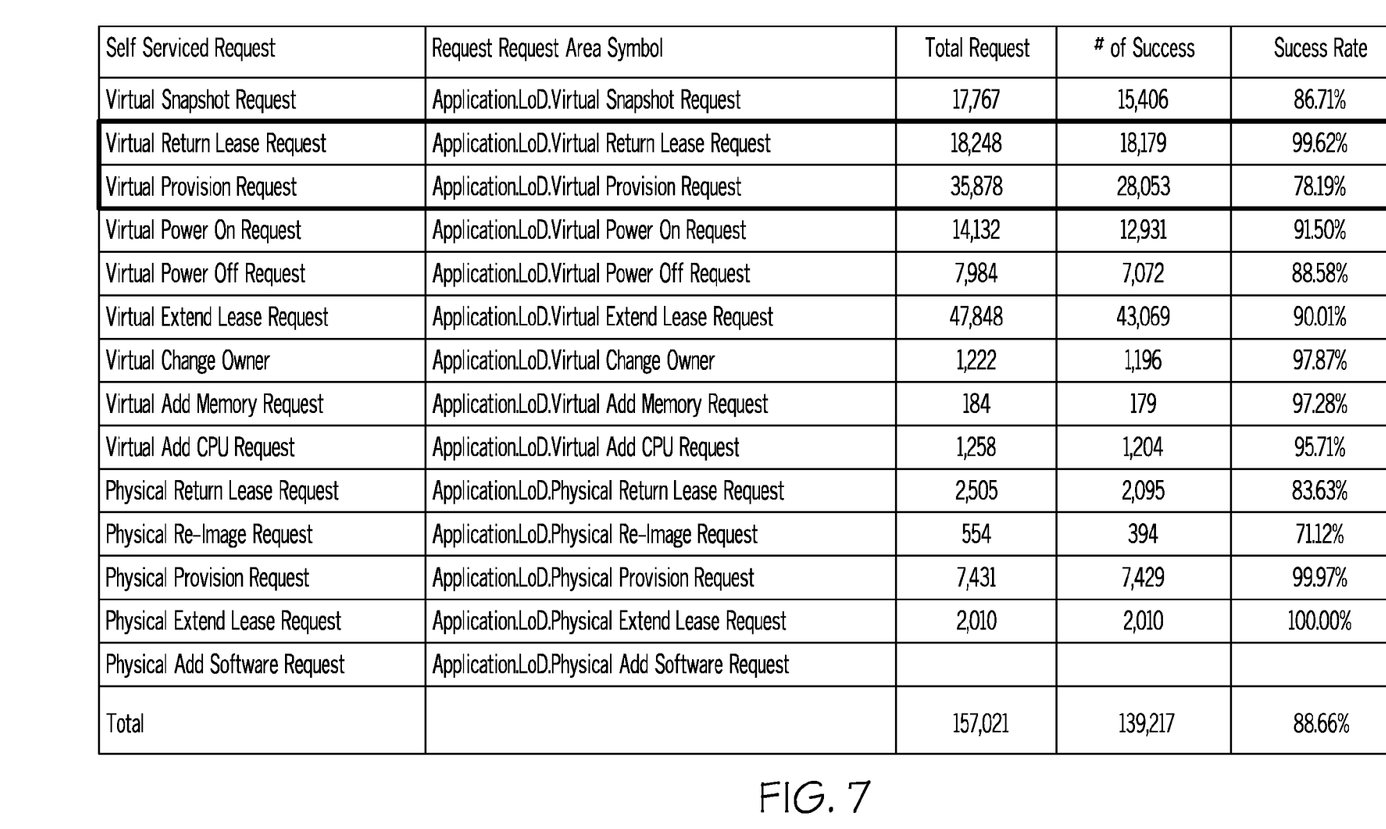
FIG. 7 illustrates information regarding self service operations requested and performed on virtual resources in an example virtual environment.

With reference to FIG. 7, the total number of provisioning and de-provisioning requests is illustrated for just one particular cloud environment for a given time period. As illustrated, the requests are quite substantial. Accordingly, reducing the cost of each of the requested operations, such as by using an adaptive preservation model, may increase performance of the cloud system.

More generally, in certain embodiments, a base snapshot is generated for virtual resources that are created. Resource usage and customer trends are monitored during use of each resource. The base snapshot may be used to revert the system to a fresh state, or the state of the system upon initial creation.

In certain embodiments, a prediction method which analyzes usage trends, history, and hardware data to suggest lists of highly utilized templates is utilized. If a resource deletion request is received, the model may determine if the resource is in a list of resources that are highly utilized. If the resource is present in the list, the resource is reverted to its base snapshot image and is placed in a resource pool where it is available for other users. Other users requesting a similar system are then assigned the base snapshot resource. Accordingly, provisioning operations may be avoided.

If a resource deletion request is received and the resource is not present in the list of highly utilized resources, the system will de-provision the virtual machine during a low-utilization period. In certain embodiments, the system is scheduled for de-provisioning at a later time period. In certain embodiments, the system is immediately de-provisioned. Utilization data may be utilized in determining when particular provisioning and/or de-provisioning tasks are performed.

In certain embodiments, template resources may be provisioned before being initially requested. For example, if a particular system configuration is known to be in high demand, such is if the utilization data indicates so, multiple instances of a virtual resource matching the system configuration may be generated during a low-utilization period. The un-used instances may be stored in a resource pool. Users may then submit requests to "provision" a new instance of a virtual resource matching the system configuration of the resources in the resource pool. Instead of provisioning a new resource, the system may merely use a resource from the resource pool.

In certain embodiments, the resources from the resource pool may be reverted virtual resources. For example, user B may request provisioning of a system that matches the system configuration of the resources in the resource pool. The provisioned resource may be assigned or allocated to user B. User B may use the assigned resource for a day, a week, or another time period. User B may then request that the system be de-provisioned or deleted.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   instantiating a virtual resource;
   in response to instantiating the virtual resource, generating a snapshot image comprising a base configuration of the virtual resource;
   receiving a request to de-provision the virtual resource;
   in response to receiving the request to de-provision the virtual resource, determining, using a processor, whether the base configuration of the virtual resource is in a set of highly utilized virtual resource configurations based on whether a frequency with which the base configuration of the virtual resource is requested is above a particular threshold; and
   in response to determining that the base configuration of the virtual resource is in the set of highly utilized virtual resource configurations:
      reverting the virtual resource to its base configuration using the snapshot image; and
      allocating the virtual resource to a resource pool.

2. The method of claim 1, further comprising:
   receiving, from a user, a request to provision a new virtual resource having the base configuration of the virtual resource; and
   in response to receiving the request to provision the new virtual resource, allocating the reverted virtual resource from the resource pool to the user.

3. The method of claim 1, further comprising:
   determining an increasing usage trend in a frequency of usage of a particular virtual resource configuration; and
   adding the particular virtual resource configuration to the set of highly utilized virtual resource configurations.

4. The method of claim 1, further comprising:
   determining a peak utilization time of day and a low utilization time of day for resources associated with provisioning operations based on utilization data for the resources associated with provisioning operations; and
   in response to determining that the base configuration of the virtual resource is not in the set of highly utilized virtual resource configurations, scheduling the virtual resource for deletion during the low utilization time of day using the resources associated with provisioning operations.

5. The method of claim 1, further comprising:
   receiving a request, from a user, to refresh the virtual resource, wherein the virtual resource is allocated to the user;
   in response to receiving the request to refresh the virtual resource, reverting the virtual resource to its base configuration using the snapshot image; and
   allocating the reverted virtual resource to the user.

6. The method of claim 1, further comprising:
   forecasting highly utilized virtual resource configurations based on trends in frequency of virtual resource utilization; and
   determining the set of highly utilized virtual resource configurations based on the forecasted highly utilized virtual resource configurations.

7. The method of claim 1, wherein the resource pool comprises a plurality of virtual resources, each having a configuration corresponding to a respective highly utilized virtual resource configuration in the set of highly utilized virtual resource configurations.

8. A computer configured to access a storage device, the computer comprising:
   a processor; and
   a non-transitory, computer-readable storage medium storing computer-readable instructions that when executed by the processor cause the computer to perform:
      instantiating a virtual resource;
      in response to instantiating the virtual resource, generating a snapshot image comprising a base configuration of the virtual resource;
      receiving a request to de-provision the virtual resource;
      in response to receiving the request to de-provision the virtual resource, determining, using a processor, whether the base configuration of the virtual resource is in a set of highly utilized virtual resource configurations based on whether a frequency with which the base configuration of the virtual resource is requested is above a particular threshold; and
      in response to determining that the base configuration of the virtual resource is in the set of highly utilized virtual resource configurations:
         reverting the virtual resource to its base configuration using the snapshot image; and
         allocating the virtual resource to a resource pool.

9. The computer of claim 8, wherein the computer-readable instructions further cause the computer to perform:

receiving, from a user, a request to provision a new virtual resource having the base configuration of the virtual resource; and in response to receiving the request to provision the new virtual resource, allocating the reverted virtual resource from the resource pool to the user.

10. The computer of claim 8, wherein the computer-readable instructions further cause the computer to perform:

determining an increasing usage trend in a frequency of usage of a particular virtual resource configuration; and adding the particular virtual resource configuration to the set of highly utilized virtual resource configurations.

11. The computer of claim 8, wherein the computer-readable instructions further cause the computer to perform:

determining a peak utilization time of day and a low utilization time of day for resources associated with provisioning operations based on utilization data for the resources associated with provisioning operations; and in response to determining that the base configuration of the virtual resource is not in the set of highly utilized virtual resource configurations, scheduling the virtual resource for deletion during the low utilization time of day using the resources associated with provisioning operations.

12. The computer of claim 8, wherein the computer-readable instructions further cause the computer to perform:

receiving a request, from a user, to refresh the virtual resource, wherein the virtual resource is allocated to the user;

in response to receiving the request to refresh the virtual resource, reverting the virtual resource to its base configuration using the snapshot image; and allocating the reverted virtual resource to the user.

13. The computer of claim 8, wherein the computer-readable instructions further cause the computer to perform:

forecasting highly utilized virtual resource configurations based on trends in frequency of virtual resource utilization; and determining the set of highly utilized virtual resource configurations based on the forecasted highly utilized virtual resource configurations.

14. The computer of claim 8, wherein the resource pool comprises a plurality of virtual resources, each having a configuration corresponding to a respective highly utilized virtual resource configuration in the set of highly utilized virtual resource configurations.

15. A computer program product comprising:

a non-transitory computer-readable storage medium having computer-readable program code embodied therewith, the computer-readable program code comprising:

computer-readable program code configured to instantiate a virtual resource;

computer-readable program code configured to, in response to instantiating the virtual resource, generate a snapshot image comprising a base configuration of the virtual resource;

computer-readable program code configured to receive a request to de-provision the virtual resource;

computer-readable program code configured to, in response to receiving the request to de-provision the virtual resource, determine, using a processor, whether the base configuration of the virtual resource is in a set of highly utilized virtual resource configurations based on whether a frequency with which the base configuration of the virtual resource is requested is above a particular threshold; and computer-readable program code configured to, in response to determining that the base configuration of the virtual resource is in the set of highly utilized virtual resource configurations:

revert the virtual resource to its base configuration using the snapshot image; and allocate the virtual resource to a resource pool.

16. The computer program product of claim 15, wherein the computer-readable program code further comprises:

computer-readable program code configured to receive, from a user, a request to provision a new virtual resource having the base configuration of the virtual resource; and computer-readable program code configured to, in response to receiving the request to provision the new virtual resource, allocate the reverted virtual resource from the resource pool to the user.

17. The computer program product of claim 15, wherein the computer-readable program code further comprises:

computer-readable program code configured to determine an increasing usage trend in a frequency of usage of a particular virtual resource configuration; and computer-readable program code configured to add the particular virtual resource configuration to the set of highly utilized virtual resource configurations.

18. The computer program product of claim 15, wherein the computer-readable program code further comprises:

computer-readable program code configured to determine a peak utilization time of day and a low utilization time of day for resources associated with provisioning operations based on utilization data for the resources associated with provisioning operations; and computer-readable program code configured to, in response to determining that the base configuration of the virtual resource is not in the set of highly utilized virtual resource configurations, schedule the virtual resource for deletion during the low utilization time of day using the resources associated with provisioning operations.

19. The computer program product of claim 15, wherein the computer-readable program code further comprises:

computer-readable program code configured to receive a request, from a user, to refresh the virtual resource, wherein the virtual resource is allocated to the user;

computer-readable program code configured to, in response to receiving the request to refresh the virtual resource, revert the virtual resource to its base configuration using the snapshot image; and computer-readable program code configured to allocate the reverted virtual resource to the user.

20. The computer program product of claim 15, wherein the computer-readable program code further comprises:

computer-readable program code configured to forecast highly utilized virtual resource configurations based on trends in frequency of virtual resource utilization; and computer-readable program code configured to determine the set of highly utilized virtual resource configurations based on the forecasted highly utilized virtual resource configurations.

* * * * *